J. L. Ripley,
Hay Fork.
No. 46,393.    Patented Feb. 14, 1865.
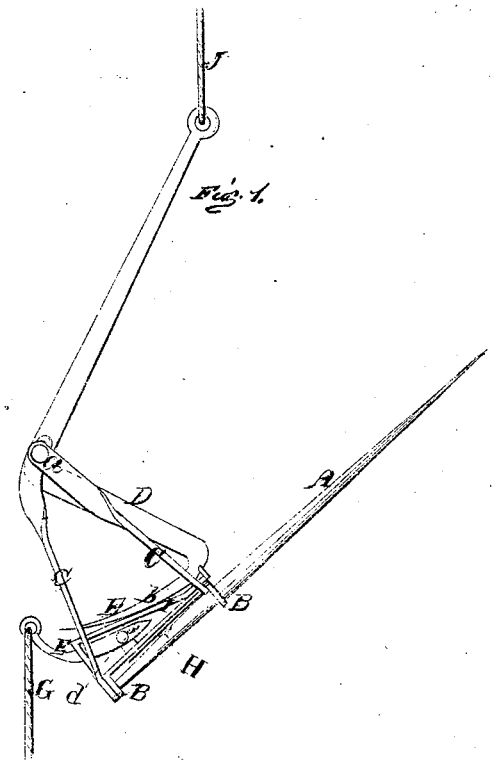
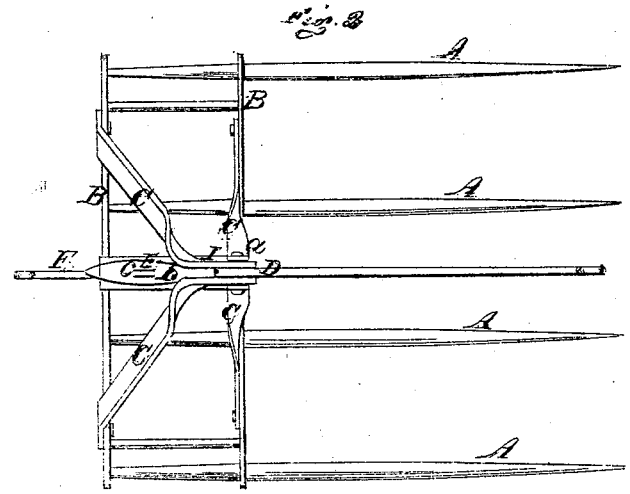
WITNESSES:    INVENTOR.

UNITED STATES PATENT OFFICE.

JOHN L. RIPLEY, OF FREMONT, OHIO.

IMPROVEMENT IN HORSE HAY-FORKS.

Specification forming part of Letters Patent No. 46,393, dated February 14, 1865.

*To all whom it may concern:*

Be it known that I, JOHN L. RIPLEY, of Fremont, in the county of Sandusky and State of Ohio, have invented a new and Improved Horse Hay-Fork; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a plan or top view of the same.

Similar letters of reference indicate like parts.

This invention relates to a new and useful improvement on a horse hay-fork for which Letters Patent were granted to me bearing date September 6, 1864.

The object of the invention is to obtain a better lock or fastening for the fork—one which will be less liable to get out of repair and become deranged by use, and capable of being operated with greater facility.

A represents the tines of the fork, which are fitted at their parts in two head bars, B B'. The tines A are straight, and the head-bars have each two oblique bars, C C, attached to them, which extend upward and are connected together at their upper ends by a rivet, $a$, a space being allowed between for the insertion of a bent bar, D, through which the rivet $a$ passes loosely, so that the bar D may work upon it.

The lower end of the bar D is bent or curved backward, as shown at $b$, and said part $b$ has a hole, $c$, made in it to receive a bolt, E. This bolt E has a curved rod, F, attached to it by a pivot, $d$, and the outer end of F has a cord, G, connected to it.

The lower end of the bolt E is attached to a spring, H, which has a tendency to keep the bolt E shoved upward through an inclined plate, I, over which the curved part $b$ of the bar D passes. This bolt E serves as a lock to keep the tines A in a proper position to retain or hold their load while the fork is being elevated, the lifting-rope J being attached to the upper end of the bar D, and in order to discharge the load from the fork when the latter reaches the desired spot, the operator pulls the cord G, and the inner end of the rod F bears against the plate I, and the bolt E is forced down free from the curved part $b$ of the bar D, and the tines A drop so that the load will fall from them. When the fork is lowered down to the hay to be elevated, the bar D is adjusted or actuated so that its lower curved part, $b$, will be brought over the bolt E, when the spring H forces the bolt E up through the slot in the curved part $b$ of the bar D, and the fork is locked. The tines are then thrust into the hay and the fork is again ready to be elevated.

I would remark that the fork is arranged with a block and tackle, so as to be raised by a horse in the usual way.

I claim as new and desire to secure by Letters Patent—

The bolt E, attached to the spring H, and having the rod F connected to it by a pivot, $d$, in combination with the inclined plate I and the curved part $b$ of the bar D, all arranged to operate substantially as and for the purpose herein set forth.

JOHN L. RIPLEY.

Witnesses:
H. W. BRISTOL,
F. S. TYLER.